UNITED STATES PATENT OFFICE.

JESSE D. BOURDEAU, OF DETROIT, MICHIGAN, AND WILLIAM B. FINK, OF WASHINGTON, DISTRICT OF COLUMBIA, ASSIGNORS TO THE QUAKER OATS COMPANY, OF CHICAGO, ILLINOIS, A CORPORATION OF NEW JERSEY.

FOOD PRODUCT.

1,381,858.     Specification of Letters Patent.     Patented June 14, 1921.

No Drawing. Application filed April 25, 1919, Serial No. 292,574. Renewed August 9, 1920. Serial No. 402,298.

*To all whom it may concern:*

Be it known that we, JESSE D. BOURDEAU and WILLIAM B. FINK, citizens of the United States, residing at Detroit, in the county of Wayne and State of Michigan, and Washington, District of Columbia, respectively, have invented certain new and useful Improvements in Food Products, of which the following is a specification.

This invention relates to a cooked food product prepared from oats or other cereals, and its object is to provide an improved product and a process whereby the same is obtained, as will be described in detail hereinafter and claimed.

The invention relates more particularly to cooked cereal grains, such as oats, which contain elements rendering them subject to deterioration, the particular objectionable element being an oil which rapidly becomes rancid and thus renders the product unpalatable, and impossible to keep.

The invention therefore has for its aim to subject the cereal to a treatment whereby the tendency to become rancid is entirely eliminated, without the destruction of the natural flavor of the product, and its keeping qualities are also increased.

The process is carried out in the following manner:

1. Clean the oats or other cereal grains to be treated, taking out all light particles.

2. Prepare an alkaline liquid composed of water to which are added lime and concentrated lye or caustic potash. For one hundred pounds of water, two pounds of lime, and two-tenths of one per cent. of lye or caustic potash will be sufficient. To this solution may also be added a small quantity of common table salt, about two per cent. being sufficient. These ingredients are placed in the water which has been heated, and the mixture is stirred but once.

3. Use the clear alkaline liquid for cooking the oats or other cereal grains, the quantity of liquid stated sufficing for from twenty-five to seventy-five pounds of cereal. The cooking may be done in any suitable steam cooking apparatus, and it is carried on for about three hours at a steam pressure of from ten to fifteen pounds.

4. After being cooked as described, the product is dried in a suitable apparatus so as to leave only from three to five per cent. of moisture present.

5. The dried product is then ground with any suitable grinder, and bolted to separate the hulls, after which the product is ready for packing in cartons or other suitable containers.

If oat groats are used, forty per cent. of the alkaline liquid to sixty per cent. of groats is the proper proportion.

The finished product is made ready to serve by placing it in boiling water, four cups of water to one cup of the product, and allowing it to remain for two or three minutes, this being sufficient to soften the granules, and it not being necessary to cook the product as this has been done already.

The result of using the herein-described method is to vastly improve the keeping qualities of the product. It is well known that on account of a relatively high oil content there is great difficulty in preparing from oats pre-cooked cereal foods which will remain free from rancidity. We have found, however, that pre-cooked oat foods prepared in accordance with this method remain free from any rancid taste or odor for long periods of time.

This we believe to be due to the fact that a portion of alkali used combined with the free acid of the oat oil and the remainder is held in loose chemical combination with the starch or other carbohydrates of the oat kernels with the result that whatever free acid is subsequently formed from the oil is immediately neutralized by this loosely combined alkali, and since free acid is a prerequisite to the formation of rancidity, no rancidity can occur in the cereal treated by this method.

The process is not limited to the grinding operation described, but the product may also be rolled into flakes, or crushed, and also shredded, or prepared in any other way cereal breakfast foods are prepared and marketed.

I claim:

1. A process of treating cereal grains having carbohydrate constituents and oily constituents which render the grains subject to deterioration by the development of rancidity, which process comprises subjecting the grains to the action of an alkaline solution sufficient to combine with the free acid of the oily constituents, and in addition to form a loose chemical combination with the carbohydrate constituents whereby any free acid which is subsequently formed from the oily constituents is then neutralized by the alkali which is loosely combined with the carbohydrates.

2. A process of treating cereal grains having carbohydrate constituents and oily constituents which render the grain subject to deterioration by development of rancidity, which process comprises cooking the grains in an alkaline solution sufficient to combine with the free acid of the oily constituents and in addition to form a loose chemical combination with the carbohydrate constituents, whereby whatever free acid is subsequently formed from the oily constituent is then neutralized by the loosely combined alkali.

3. The process of treating cereal grains having carbohydrate constituents and oily constituents which render the grains subject to deterioration by the development of rancidity, which method consists in preparing an alkaline liquid in substantially the proportions of 100 pounds of water, two pounds of lime and two tenths of one per cent. of caustic potash, placing in the liquid from twenty-five to seventy-five pounds of the cereal grain and cooking the grain in the liquid for about three hours at a pressure of from 10 to 15 pounds per square inch.

4. A process of treating cereal grains having carbohydrate constituents and oily constituents which render the grains subject to deterioration by the development of rancidity, which process comprises cooking the grains under pressure in an alkaline solution sufficient to combine with the free acid of the oily constituents, and in addition to form a loose chemical combination with the carbohydrate constituent, whereby whatever free acid is subsequently formed from the oily constituents is then neutralized by the loosely combined alkali.

In testimony whereof we affix our signatures.

JESSE D. BOURDEAU.
WILLIAM B. FINK.